Sept. 6, 1966 P. TISHKEN 3,270,541
ROLLING, CUTTING, AND NOTCHING MACHINE
Filed Nov. 4, 1963 9 Sheets-Sheet 1

Fig. 1
Fig. 17
Fig. 18

INVENTOR.
PAUL TISHKEN
BY Allan J. Murray
ATTORNEY

Sept. 6, 1966　　　　　　　P. TISHKEN　　　　　　3,270,541
ROLLING, CUTTING, AND NOTCHING MACHINE
Filed Nov. 4, 1963　　　　　　　　　　　　　9 Sheets-Sheet 3

INVENTOR.
PAUL TISHKEN
BY Allan J. Murray
ATTORNEY

Sept. 6, 1966 P. TISHKEN 3,270,541
ROLLING, CUTTING, AND NOTCHING MACHINE
Filed Nov. 4, 1963 9 Sheets-Sheet 5

INVENTOR.
PAUL TISHKEN
BY Allan J. Murray
ATTORNEY

Sept. 6, 1966    P. TISHKEN    3,270,541

ROLLING, CUTTING, AND NOTCHING MACHINE

Filed Nov. 4, 1963    9 Sheets-Sheet 6

INVENTOR.
PAUL TISHKEN
BY Allan J. Murray
ATTORNEY

Sept. 6, 1966    P. TISHKEN    3,270,541
ROLLING, CUTTING, AND NOTCHING MACHINE
Filed Nov. 4, 1963    9 Sheets-Sheet 7

INVENTOR.
BY PAUL TISHKEN
Allan J. Murray
ATTORNEY

Sept. 6, 1966  P. TISHKEN  3,270,541

ROLLING, CUTTING, AND NOTCHING MACHINE

Filed Nov. 4, 1963  9 Sheets-Sheet 8

INVENTOR.
PAUL TISHKEN
BY Allan J. Murray
ATTORNEY

United States Patent Office 3,270,541
Patented Sept. 6, 1966

3,270,541
ROLLING, CUTTING, AND NOTCHING MACHINE
Paul Tishken, 13000 W. Eight Mile Road, Detroit, Mich.
Filed Nov. 4, 1963, Ser. No. 321,067
8 Claims. (Cl. 72—132)

This invention relates to improvements in machines to initiate and progressively form contours extending longitudinally of flat, elongated stock, and to sever said stock into uniform desired lengths while striking notches in said contours.

The particular example disclosed hereinafter is a machine for forming aluminum siding for buildings (although, of course, no restriction as to material is intended). Such siding approximately simulates the appearance of lumber used for the same purpose. To afford the lapping and interengagement necessary to apply the siding to a building the longitudinal marginal edge portions must be given a suitable contour. Further, the siding must be severed into lengths which can be handled and applied with reasonable effort. Thus, provision must be made to allow a lapping of the marginal end portions of the lengths, to better resist entrance of moisture behind the siding. Such provision entails striking out notches at the ends of said lengths, in said contours, which would otherwise prevent said lapping.

Said longitudinally extending contours are most economically applied by directing the stock material along a path of travel through a continuously operating rolling machine, wherein successive pairs of rollers progressively develop the desired contour. The siding, as described hereinafter, has at least one longitudinal marginal edge portion formed, when the contour is completed, so that employment of the necessary dies to effect said notching is extremely difficult. Also the notching operation would distort the carefully developed contour so that the end portions of the siding would not properly overlap.

However, if such operation is attempted before the stock enters the machine, as has been the past practice, the metal is distorted in the areas marginal of the notches, so that the finished result is unsatisfactory and difficult to work with.

A proposed solution, which has hitherto been dismissed as unworkable, is to effect the severing and notching operation at a stage in said contour development in which the contours are sufficiently developed to resist distortion from the notching dies, but not developed to the extent that any contour, due solely to its formation would result in deformation. This solution is facilitated by provision for moving the dies in the direction of stock travel during the operation, and, of course, retracting them after each such operation.

An object of the present invention is to provide in a rolling machine for the purpose above described, dies actuable to sever and notch said stock, said dies being disposed along said path of travel of the stock in a position corresponding to a predetermined stage of contour development.

A further object is to mount said dies for travel in the direction of stock travel and to provide means to drive the dies in such travel during the severing and cutting operation, and to further provide means to drive them in retractive travel after each such operation.

These and various other objects are attained by the construction hereinafter described, and illustrated in the accompanying drawings, wherein.

In these views the reference characters 1 and 2 designate similar hollow bases. Each said base has a front wall 3, a rear wall 4, end walls 5 and 6, and a top wall 7. Surmounting each top wall is a mounting plate 8, secured in position in any conventional manner.

Drive to rollers

Enclosed within each base is an electric motor 9, fixed on a mounting bracket 10. The shaft 11 of each motor mounts a pulley 12. Belts 13 transmit a drive from said pulley 12 to a flywheel-pulley 14, which drives an air operated clutch 15 of conventional commercial design. The details and operation of said clutch are fully disclosed in my patent application Serial Number 109,399.

The walls of a clutch housing 16, are adapted to journal a shaft 17 of the flywheel-pulley and a shaft 18, driven by said clutch 15 when the latter is engaged. Said drive shaft extends through a gear housing 19, and projects therefrom to receive a coupling 21 through which it drives a shaft 22, which also extends through a gear housing 19. The shaft 22 is coupled at 21 to a shaft 17 of the flywheel-pulley 14 on base 1.

Figure 4:
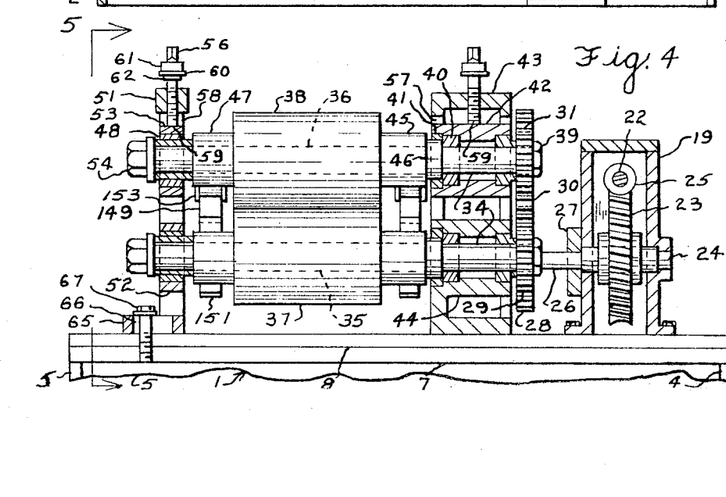
FIG. 4 is a partial, vertical, sectional view on line 4—4 of FIG. 1.

Rotatable in each gear housing 19 is a worm gear 23, rigidly mounted on a shaft 24. A worm 25, rotatable with shaft 18 drives the worm gear in its rotation. As best seen in FIG. 4, a portion 26 of the shaft 24, projects through the wall of the gear housing 19, and through a shaft retaining plate 27. Means may be provided at the walls of the gear housing to journal the shaft 24, as shown in FIG. 4. A gear 28 is rigidly carried by the said portion 26 of said shaft 24. As is clearly shown in FIG. 10, the gear 28 drives lower gears 29. A gear 30 is engaged with and transmits a drive from the gear 28 to upper gears 31. A shaft 32 mounts the gear 30 and is journaled in bosses 33 formed on the walls of a bracket 52.

Rollers

End portions 34 of lower and upper shafts 35, 36, respectively mount the gears 29 and 31. A lower roller 37 is mounted upon and rotatable with the lower shaft, and an upper roller 38 is similarly mounted upon upper shaft 36. The end portions 34 of the shafts 35, 36 terminally receive nuts 39 to retain the gears thereon.

The end portions 34 journal in bearings 40, which may be equipped with lubrication seals, as at 41. An upper bearing is received in rear bearing block 42 which is in turn received and supported in an upright bracket 43. A lower bearing is received in a bearing block 44 which is rigid, and may, if desired, be integral with the bracket.

Spacer sleeves 45 are interposed between the rollers 37, 38 and annular shoulders 46 formed on the shafts 35, 36. Spacer sleeves 47 are interposed between said rollers, at their opposite ends, and bearings 48. The bearings are mounted in a front bracket 51, being received in a lower bearing block 52, and an upper bearing block 53. Nuts 54 are received on the shaft end portions to maintain the described assembly.

Adjustable upper roller

To produce the finest results on the finished product, it is desirable that one of each pair of rollers be adjustable to and from the other. This affords spacing the rollers to achieve a relationship therebetween which best applies the contours formed on the roller to the stock material A. No effect is made in the drawings to portray such contours, as each pair would differ slightly from each succeeding or preceding pair, and as the particular contour to be applied to the stock will vary depending on the use of the finished product.

Figure 2:
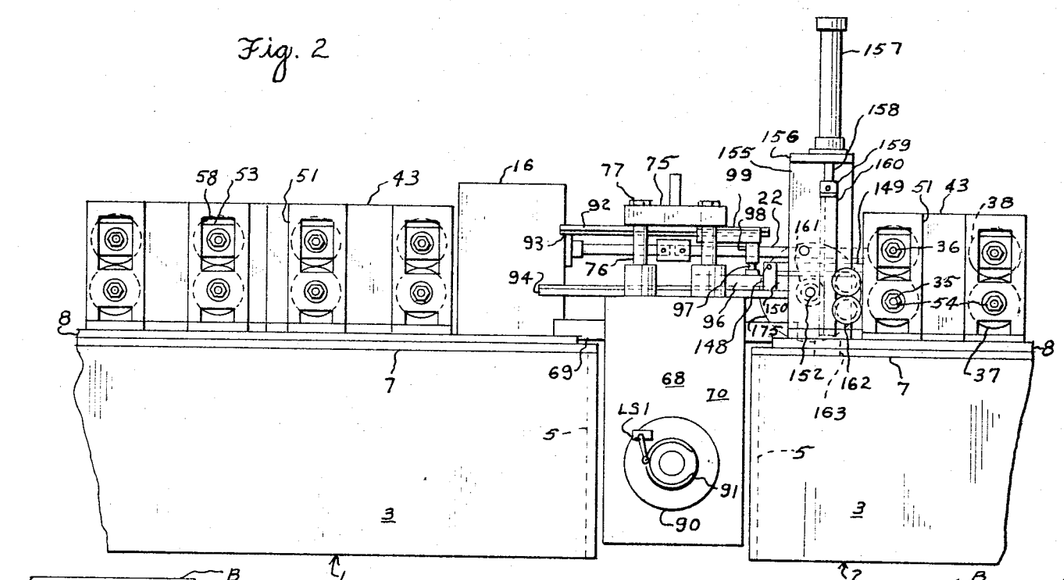
FIG. 2 is a partial front elevational view on line 2—2 of FIG. 1, omitting the dies.
Figure 3:
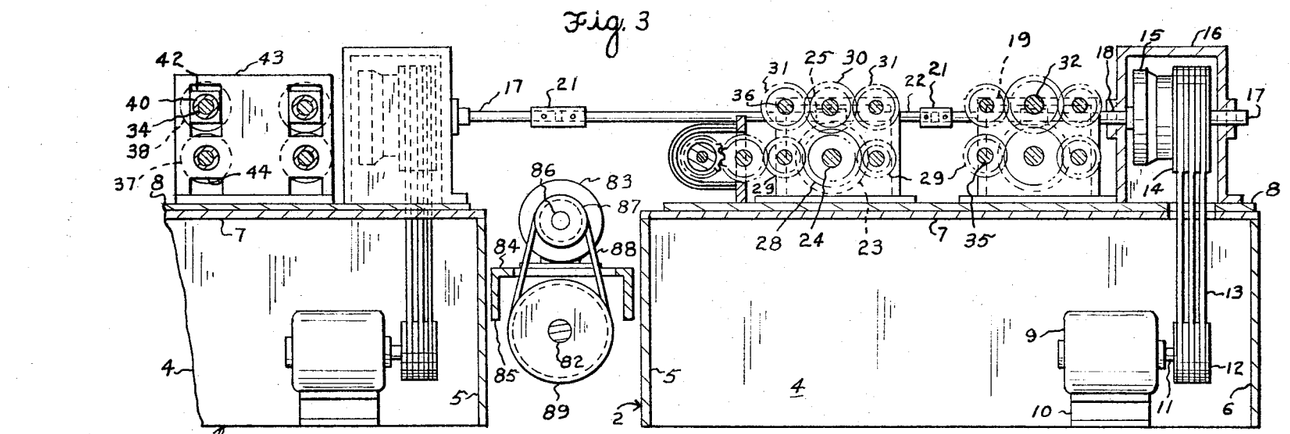
FIG. 3 a partial, vertical, sectional view on line 3—3 of FIG. 1.
Figure 5:
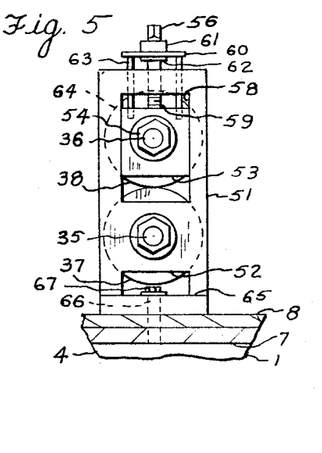
FIG. 5 is a partial, vertical, sectional view on line 5—5 of FIG. 4.

Adjustability may be accomplished in any conventional manner. However, the mechanism proposed for use with this machine is exemplified in FIGS. 4 and 5. While such mechanism is not shown in FIGS. 1, 2, and 3, due to the smaller scale employed in these latter views, it is believed that one skilled in the art would have no difficulty in understanding their application in said views.

Said mechanism comprises an adjusting screw 56 which has threaded engagement through the top walls of brackets 43, 51. Said adjusting screw has its lower end face bearing upon the upper bearing block 42, or 53, which are vertically slidable in slideways 57, or 58, formed in the respective brackets. Thus, rotation of the screws 56 in one direction would drive said bearing blocks downwardly. At its upper end, each adjusting screw 56 passes rotatably through a bar 60. Said bar is held against axial movement on the adjusting screw by an annular shoulder 61, and an annular collar 62 rigidly but removably carried by the screw.

Flanking the adjusting screw is a pair of elongated, headed screws 63 having their heads recessed into the bar 60. The lower, threaded end portions of said screws 63 are received in tapped holes 64 in said top faces of the upper bearing blocks 42, 53. Thus, rotation of the adjusting screw 56 in the reverse direction to that aforesaid causes said bearing blocks to be drawn upwardly. Obviously, vertical movement of said blocks 42, 53 carries the shafts 35, 36 and rollers 37, 38 to a desired position.

A flange 65 extends from the base of bracket 51, and is slotted at 66 to receive a screw and washer 67 which, threading into the mounting plate 8 and top wall 7, affords adjusting movement of brackets 51 to and from brackets 43.

Die actuator mechanism and housing

It will be seen, now, that by appropriately contouring successive (right to left in FIGS. 1, 2, and 3) pairs of rollers, and moving stock material therethrough sequentially, each pair of rollers contributes toward development of the contours to the stock so that such stock emerges from the last pair of rollers with the desired contours fully developed. As stated above, the problem is to select a predetermined stage of contour development wherein said contours B and C resist distortion from the notching operation, but have not been developed to the point at which the developed form itself defies efforts to strike notches without resultant distortion.

Figures 1, 17:
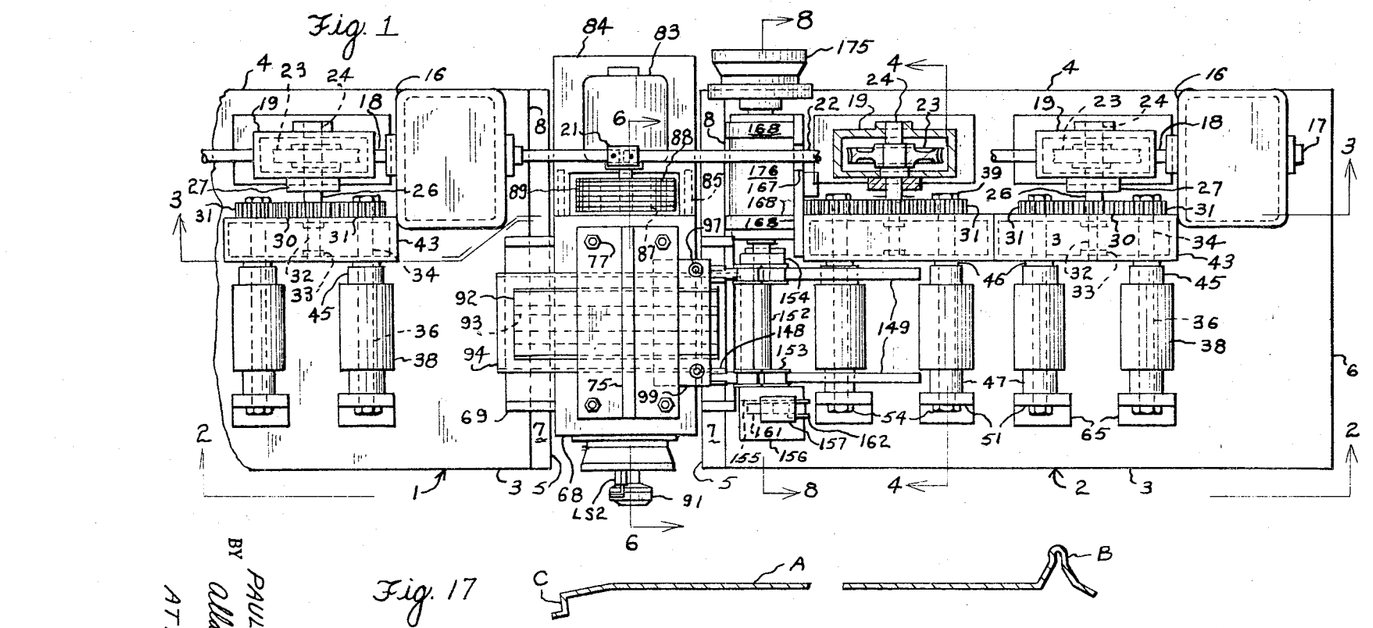
FIG. 1 is a partial plan view of the improved rolling, severing and notching machine.
FIGS. 17, 18, are sectional views and 19, is an end view of the siding, depicting contour development in various progressive stages.
Figure 6:
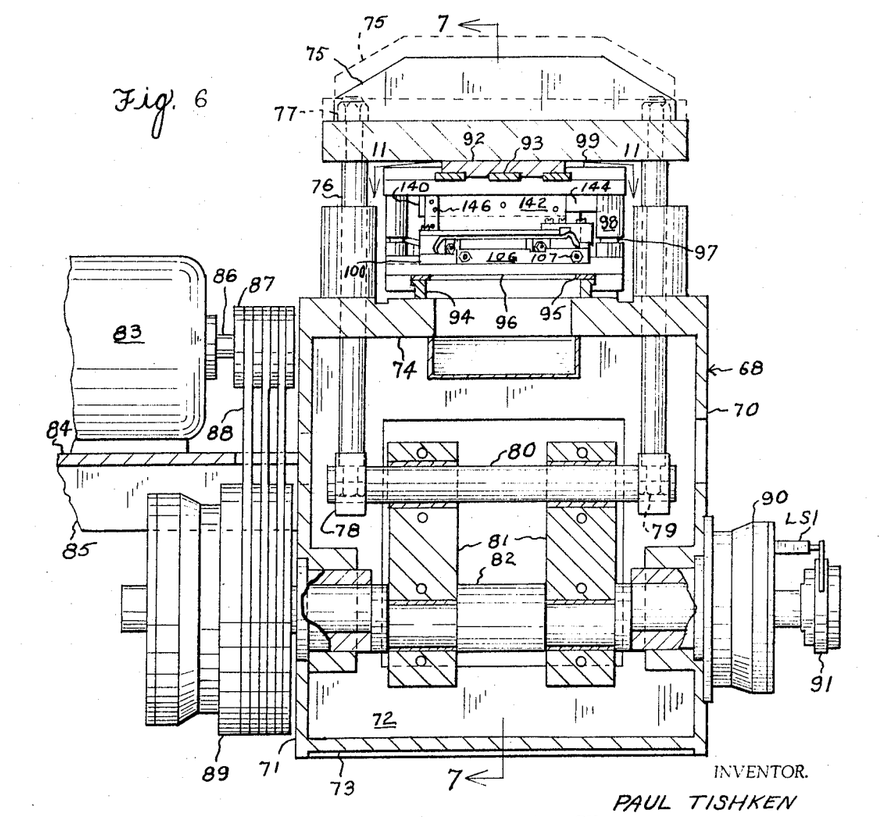
FIG. 6 is a partial, vertical, sectional view of the dies and die operating mechanism on line 6—6 of FIG. 1.

To accomplish this, a die actuator housing 68 is disposed along the path of stock travel at said predetermined stage, such stage, for the siding earlier mentioned, might conform in sectional view to FIG. 17. Arms 69 extend from each side of said housing to suspend it from the bases 1 and 2. The housing is formed with a front wall 70, a rear wall 71, side walls 72, a bottom wall 73, and a top wall 74, as well seen in FIGS. 6 and 7.

Above said top wall 74 is elevated a die support platform, mounted on draw rods 76, the upper end portions of which are threaded to receive retaining nuts 77. Said draw rods are disposed in pairs, and have the lower end portions of each pair joined by brackets 78 and secured therein by nuts 79 to ensure that the draw rods of each pair will operate as a unit as hereinafter explained. A wrist pin 80 extends between the pairs of draw rods, and is itself driven by connecting rods 81 mounted on the crankshaft 82.

Externally of the housing 68, at the rear thereof, an electric motor 83 is mounted upon a platform 84 which may be integral with the housing, and may be formed with supporting ribs 85. The motor shaft 86 mounts and rotatively drives a pulley 87, which, through belts 88, drives a die-advancing air clutch 89 mounted on an end portion of the crankshaft, such drive being to the flywheel-pulley of the clutch. Such clutch like the one earlier described, is fully detailed and explained in my patent application 109,399, as is the air-brake 90, which is effective upon the opposite or front end of the crankshaft 82. Terminally of the front end of said crankshaft is mounted a rotary cam 91 which takes effect, as explained hereinafter, upon a limit switch LS1. Each time the crankshaft is rotated the upper die support platform is drawn downwardly to the position shown in FIGS. 6, 7, and returned to the dash line position in said figures.

Dies and die holders

Attached to and beneath the upper die support platform as by screws (not shown) 75 is a slideway 92, provided with elongated bearings 93. Another slideway 94 is attached upon the top wall 74 of the housing 68, and is also provided with elongated bearings 95. Screws (not shown) may secure said bearings 93, 95 in position.

A lower die holder 96 is slidably mounted on the last described slideway, 94. Guide pins 97 have their lower end portions fixed in said lower die holder. The upper end portions of the guide pins are received in bushings 98 rigidly dependent from an upper die holder 99, which is slidably mounted on the aforesaid slideway 92. The bushings 98 are slidable upon said guide pins to afford descent of the slideway 92, die holder 99 and associated dies described below, when the upper die platform 92 is drawn down by actuation of said crankshaft 82.

FIGS. 11, 12, 13, 14, and 15 are on a large scale to illustrate the die holders in assembly (though slideways 92, 94 and the top wall 74 and upper die support platform 75 are omitted). Of these, FIGS. 14 and 15 perhaps best portray the lower die halves 100 centrally spaced apart from each other to accommodate a portion 142 of upper dies, subsequently described. Said lower die halves 100 are secured by screws 101 having their heads engaged in slots 102 downwardly opening from the bottom face of the lower die holder 96. Washers 103 receive the upward thrust of said screw heads.

The lower die holder is apertured at 104 to downwardly pass scraps of stock material resulting from die operations. Marginally of said aperture, upstanding abutments 105 serve to position the lower die halves, spacing them from each other appropriately to receive said portion 142 of said upper die. To resist the powerful forces at play when the die mechanism operates, which forces tend to push said die halves away from each other, retaining blocks 106 are secured on the die holder outwardly of the lower die halves 100. Said retainers receive nut and screw combinations 107 of a usual type the screw member of which may be forced against the respective lower die to oppose any movement away from the opposite die. A flat, vertically directed recess 108 affords access for adjustment of the nut and screw 107.

In the form illustrated in the drawings, the siding has contours B and C applied to its longitudinal, marginal, edge portions, and the lower dies must be similarly contoured to support said edge portions during the severing and notching operation. The central, straight cut of the stock material may be made by straight dies and this affords easy sharpening of the dies when they become dull. But on some installations the end portions of the die, corresponding to said contours as developed at that stage, do not readily lend themselves to resharpening. Thus, such die portions are made independent of the lower die halves, as at 109, 110, and are secured in position by screws 111. The die portions 110 are elevated on blocks 112 to the required height.

Figure 14:
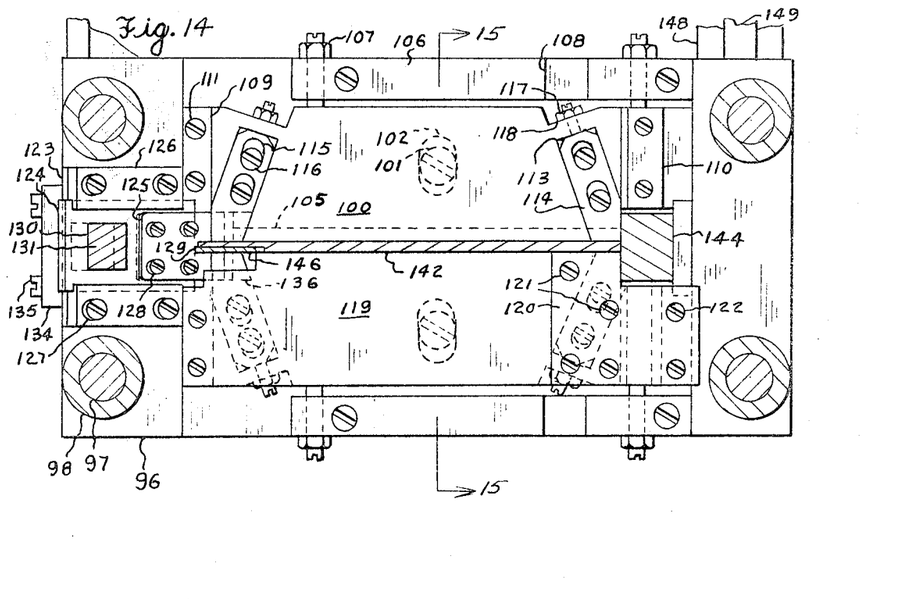
FIG. 14 is a partial, horizontal, sectional view on line 14—14 of FIG. 13.
Figure 15:
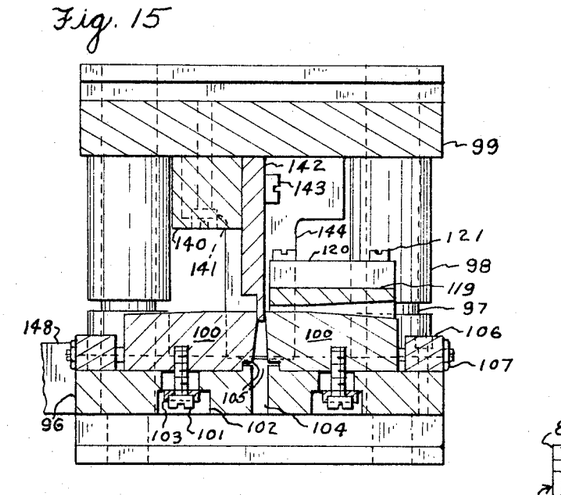
FIG. 15 is a partial, vertical, sectional view on line 15—15 of FIG. 14.
Figure 16:
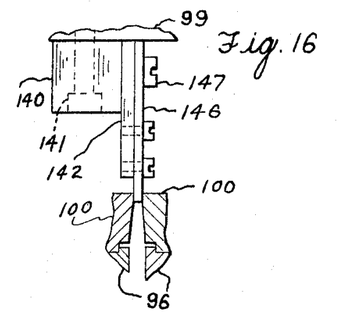
FIG. 16 is a partial, sectional view on line 16—16 of FIG. 12.
Figure 18:
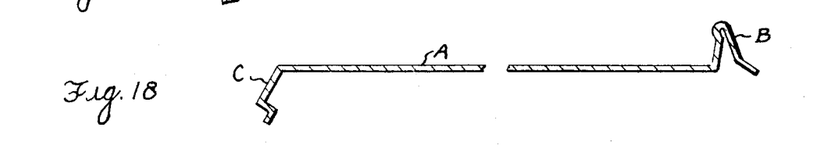
Figure 19:
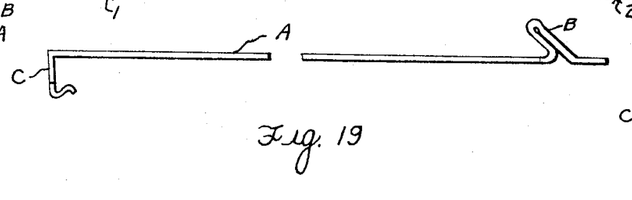
Figure 20:
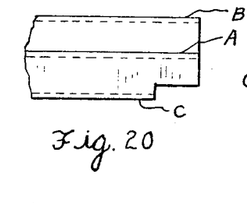
FIGS. 20 and 21 show notched marginal end portions of the siding.
Figure 21:
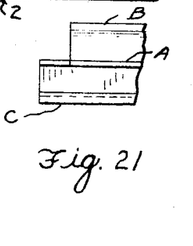

In the lower die halves are formed dead end grooves 113 to receive adjustable die sections 114. As best seen in FIG. 14, these die sections form lateral edges on the lower die halves, and are formed with grooves 115 to receive headed screws 116 which thread into the bodies of the respective die halves, and may afford sliding advance of the die sections 114 in the grooves to compensate for material ground from said lateral edges in resharpening. If this adjustment were not possible, each time the lower die halves were sharpened more material would be removed from said lateral edges, thus developing a gap between such edge and the upper dies, hereinafter described, which would create a poor metal cutting situation and permit distortion of stock material. Nut and screw adjustments 119 are provided to control the advance of the die sections 114, and angled flats 118 receive the nuts of said combinations.

To ensure that the severed end of a length of stock material remains in the desired path as it leaves the dies, a flat elongated plate 119 extends over one lower die half, being secured at one end by the aforesaid screws 111 and at the other end by screws 121 extending through a support block 120. For contour B, a die section is disposed above the stock material and held in place beneath said plate 119 by screws 122.

Lower notching die

At the left, as viewed in FIGS. 11, 12, 13 and 14, secured to the lower die holder 96, as by screws (not shown) is a slide block 123. Slidable thereon is a carrier 124 for a lower notching die 125, said carrier being recpirocably slidable on the slide block at an angle appropriate to strike notches in contour C. Retaining bars 126 retain the carrier 124 upon the slide block 123, while affording said reciprocable sliding action. Screws 127 secure the retaining bars to the slide block; screws 128 secure the notching die in its position on the carrier.

Figure 12:
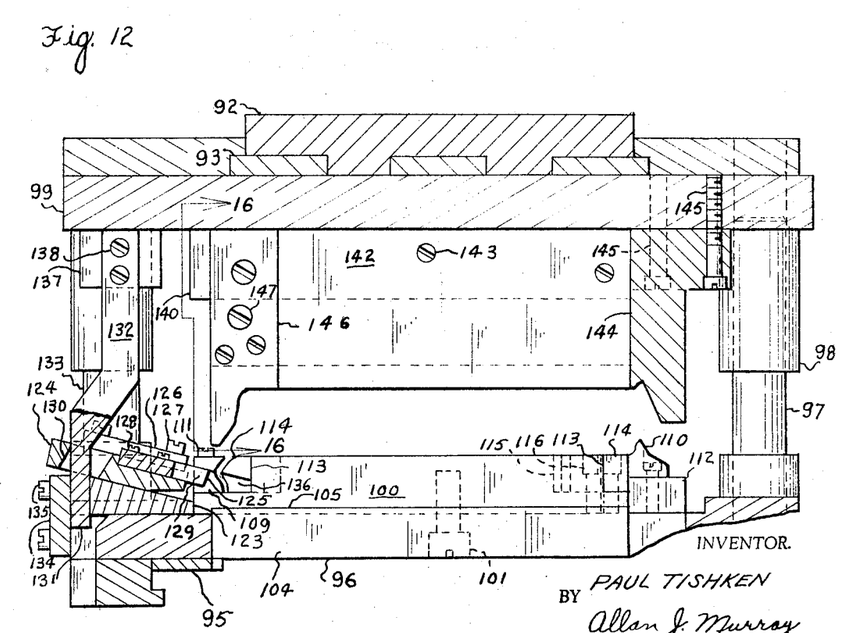
FIG. 12 is a partial, vertical, sectional view on line 12—12 of FIG. 11 with the dies parted.
Figure 13:
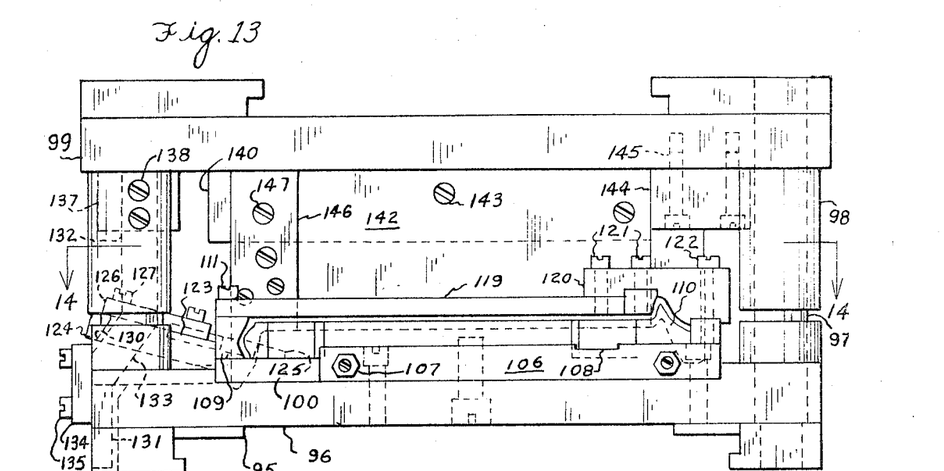
FIG. 13 is a partial, elevational view on line 13—13 of FIG. 11, with the dies closed.

The lower notching 125 is formed with a slot 129 to receive upper die 142 and avoid interference therewith, as explained below. Said die carrier is formed with a hole 130 to slidably receive the lower end portion of an elongated cam member 132, and to be actuated toward and away from said contour C by an angled center portion 132 of said cam member. To resist motion of the lower portion 131, a retaining plate 134 is secured by screws 135 to the slide block and the lower die holder 96. As is best shown in FIG. 12, the adjustable die sections 114 nearest the notching die are formed, as at 136, to pass the notching die 125.

The cam member 132 depends by its upper end portion from a mounting block 137, and is secured thereto by screws 138. Screws 139 secure the mounting block 137 to the upper die holder 99.

Upper dies

An elongated mounting block 140 is secured by screws 141 to said upper die carrier 99. A straight-cut die blade 142 is secured to said block by screws 143. At its right hand end, as viewed in FIGS. 11, 12, and 13, said mounting block carried by means of screws 145 an upper notching die 144, having its lower face contoured to conform to contour B of the stock material A, as developed at this point. Said straight-cut die 142 is recessed slightly at its left end as seen in said last mentioned views to receive a contoured die blade 146 for contour C of the stock, said blade being retained by screws 147. The described arrangement affords replacement of the contoured die parts 144, 146 which cannot be resharpened as readily as can the straight-cut die 142.

Die advance and die retraction

Blocks 148 are mounted at the rearward edge of the lower die holder 97 in any convenient manner as by screws (not shown).

Figure 7:
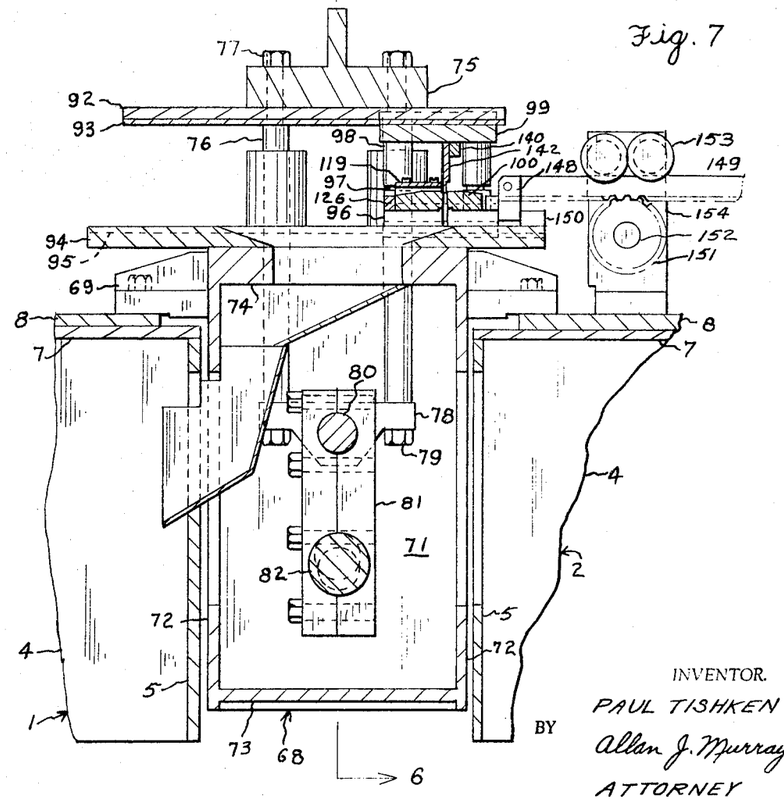
FIG. 7 is a partial, vertical, sectional view on line 7—7 of FIG. 6.
Figure 8:
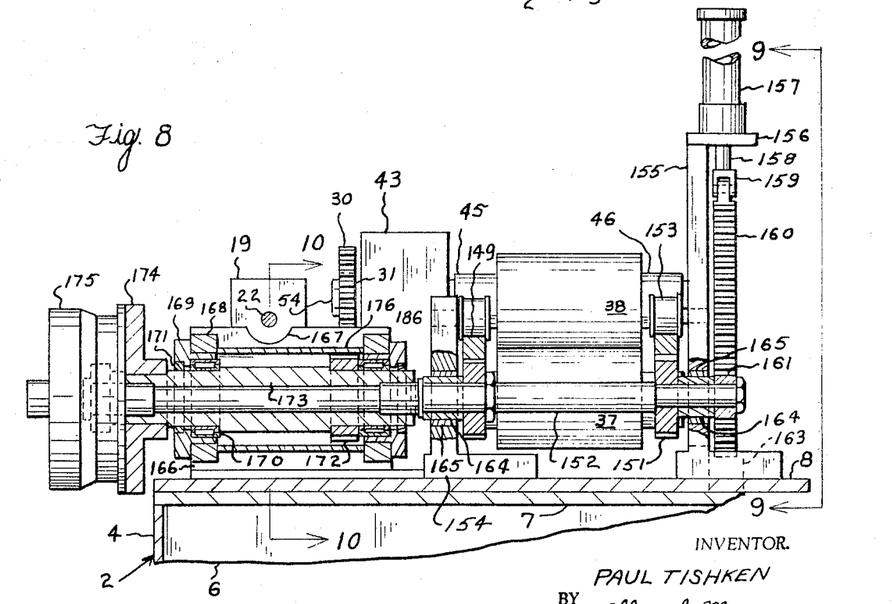
FIG. 8 is a partial, vertical, sectional view on line 8—8 of FIG. 1.
Figure 9:
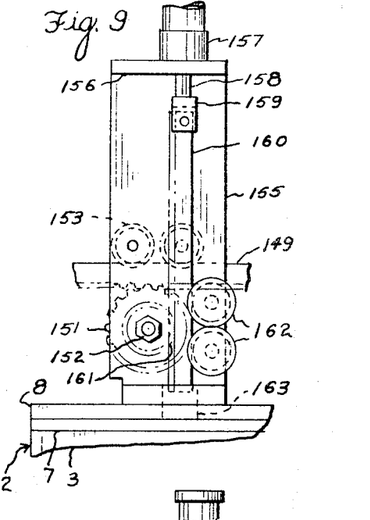
FIG. 9 is a partial vertical, sectional view on line 9—9 of FIG. 8.

Racks 149 have their forward ends connected to said blocks, whereby said lower die holder may be advanced and retracted in reciprocable sliding travel on the lower slideway 94. A stop bar 150 limits retractive travel. The racks 149 are driven and supported by pinions 151 rigidly mounted for rotation with a shaft 152. Rollers 153 retain the racks in engagement with said pinions. As seen in FIGS. 7, 8, and 9, the shaft 152 journals in brackets 154, 155, while the rollers 153 have their shafts secured in said brackets.

The larger of said brackets, 155, upwardly terminates in a transversely extending flange 156, surmounted by a fluid motor 157. The piston rod 158 of the fluid motor is coupled at 159 to a die retracting rack 160. As will presently be clear, a pinion 161 is mounted on the shaft 152, and is rotatively driven thereby to drive the rack upwardly when pinions 151 drive racks 149 in their advance. Said pinion is reversely driven to retract the racks as described below. Rollers 162 maintain the engagement of the rack 160 and pinion 161. A hole 163, formed in the mounting plate 8 and top wall 7, affords clearance for the retraction rack 160 when it is driven downwardly by the fluid motor 157.

Spacing sleeves 164 are received on the shaft 152 to aid in maintaining the position of the pinions 151 thereon, and rotate with said shaft in bearings 165. The left portion of said shaft as veiwed in FIG. 8, is received in a housing comprising a vertical plate 166, arcuately recessed to clear the shaft 22. Heavy spaced plates 168 secured to plate 166 as by welding form the ends of said housing.

The end plates 168 concentrically receive flanged bearing blocks 169 which receive bearings 170, and which may be provided with lubricant seals 171. Interiorly of the housing a drive gear 172, rotatively drives a tubular shaft 173 which rotates fully upon the elongated shaft 152. The tubular drive shaft drives an annular drive plate 174, which rotatively drives housing of an air-clutch 175. Said clutch is similar to the air-clutch 15 and 99, and like them, is explained in patent application 109,399. The tubular shaft 173 and annular drive plate 174, provide the drive to the clutch which flywheel-pulleys supply on clutches 15 and 99. An arcuate closure 176 may seal off the mechanism from dust and dirt.

*Electrical diagram and operation*

The electric motors 9 drive the rollers 37, 38 as explained above, and between the rollers is fed a continuous roll of stock material, as from a coil thereof, not shown. Each pair of rollers is contoured, and the contour of each succeeding pair of rollers is somewhat advanced from that of the preceding roller, so that as the stock moves through each said pair in sequence, the contour is developed on the stock material. A run off table, similar to that shown in my patent application 109,399 may be provided, and a mechanical limit switch LS1 may be employed as shown in said application.

Figure 10:
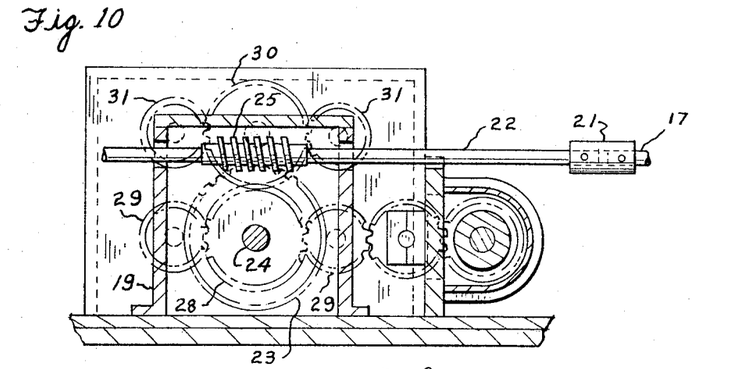
FIG. 10 is a partial vertical, sectional view on line 10—10 of FIG. 8.
Figure 11:
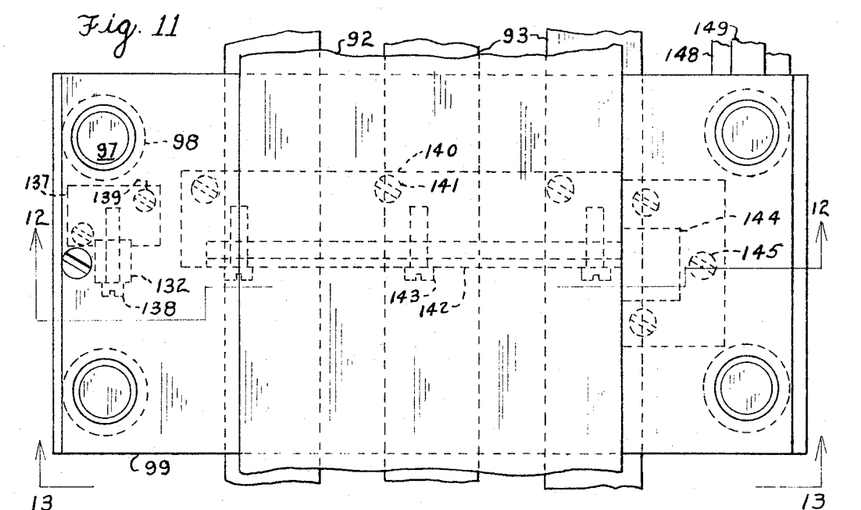
FIG. 11 is a partial, horizontal, sectional view on line 11—11 of FIG. 6.

Switch LS1 is mechanically operated by means of the advancing severed end of the stock material A. Closing said switch energizes solenoid S1 which operates valve V1 to admit aid to and engage the clutch 175. The gear 172 receives a constant drive from gear train 28, 29, 176, as is best shown in FIG. 10. Such drive is transmitted through tubular shaft 173 and annular drive plate 174. When the clutch 175 is engaged as aforesaid, the drive is transmitted thereby to that shaft 152, which through pinions 151 drive racks 149 to advance the lower die holder 96. The latter is connected by the guide pins 97 with the upper die holder 99, which is therefore also advanced.

Closing switch LS1 also energizes solenoid S2 which operates valve V2 to exhaust air from fluid-motor 157, and afford an upward drive to the piston rod 158 thereof via the retracting rack 160 and pinion 161, which is also rotatively driven by the shaft 152. Thus, the retracting mechanism offers no effective resistance to the advance of the dies.

Solenoid S3 is also energized to operate valve V3 to admit air to the clutch 89 to drive the crankshaft. This drive coincides with the advance of the dies, and by means of draw rods 76, the upper die support platform 75 is drawn down. The upper die holder 99 is, of course, lowered to bring the upper and lower dies into acting relationship as they are simultaneously advanced at the speed of stock travel, so that any stress upon the stock material is held to a minimum.

To enable the crankshaft to rotate without resistance from the brake 90, LS1, when closed, energizes solenoid S4, which operates a valve V4 to exhaust air from and disengage said brake.

A second limit switch LS2 is mounted on the face of the brake 90, and has a lever engaging and operable by an annular cam block 91. Said cam is so disposed that the cam block operates LS2 to terminate the above described action after one revolution of the crankshaft 82.

The result of closing LS2 is to energize relay R2, opening contact R2a, and denergize solenoids S1, S2, S3, and S4, to reverse the action of valves V1, V2, V3, and V4. Thus air is exhausted from the die-advance clutch 175 terminating its drive to shaft 152. Without such drive shaft 152 may be, and is, driven reversely by admission of air to fluid motor 157 which drives the piston rod 158 and retracting rack 160 downwardly, driving the pinion 161 to reversely rotate and shaft 152 and pinions 151, whereby the latter retract racks 149 and the above described die-holder assembly.

Simultaneously, air is exhausted from clutch 89, terminating the drive to the crankshaft 82, and air is admitted to the brake 90 to stop rotation of said crankshaft. When the next succeeding severed end of stock closes LS1, the cycle is repeated. A trough 177 affords discharge of scrap material from the dies through holes 178 in the lower die holder and 179, 180 in the slideway and top wall 74.

Figure 22:
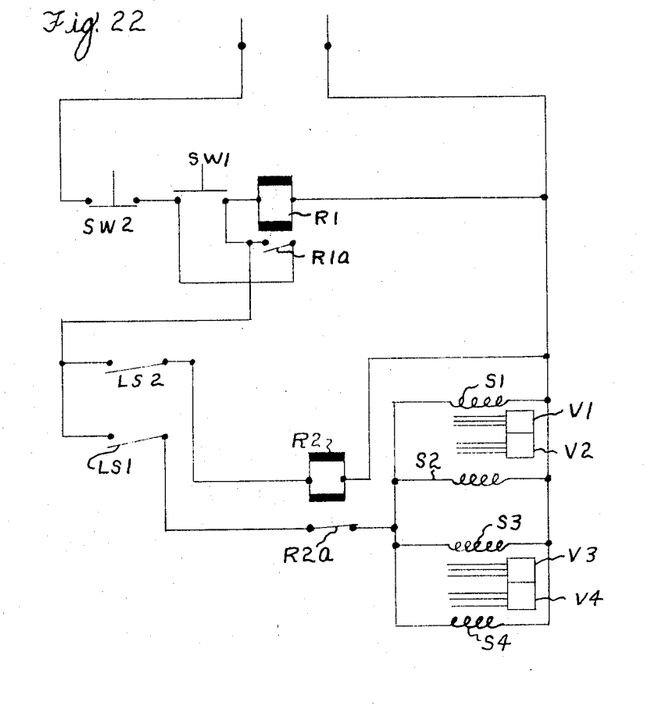
FIG. 22 is an electrical diagram of the wiring to operate the die mechanisms.

SW1 and SW2 are Start-Stop switches in the aforesaid diagram. SW1 need be depressed only momentarily to energize relay R1a to afford a shunt around SW1.

What I claim is:

1. A machine to initiate and progressively develop one or more desired contours extending longitudinally of flat, elongated stock material, following a path of travel through said machine, and to sever said stock into desired lengths and strike notches in one or more of said contours in the course of said development, said machine including,
   (a) a plurality of pairs of rollers, said stock passing between the rollers of each pair, each said pair of rollers being contoured to apply such contour to said stock, said pairs being disposed to sequentially receive and pass the stock to progressively develop said desired contours,
   (b) a stationary die bed disposed along said path of travel in a position corresponding to a predetermined stage of contour development,
   (c) a movable die bed, similarly disposed and actuable to move to and from the stationary bed.
   (d) a first die holder mounted upon said stationary bed,
   (e) a second die holder carried by the movable bed,
   (f) an acting die carried by the second die holder,
   (g) a passive die mounted on the first die holder,
   (h) means to actuate the movable die bed to and from the stationary die bed to cause said dies to coact to sever and notch the stock at said predetermined stage,
   (i) a first slideway formed on the stationary die bed, and said first die holder (d) being mounted on said first slideway for reciprocable sliding travel thereon,
   (j) a second slideway formed on the movable die bed, and said second die holder (e) being carried on said second slideway, for reciprocable sliding travel thereon,
   (k) means interconnecting said die holders to afford simultaneous sliding travel thereof on said slideways,
   (l) drive means to advance die holders in said reciprocable sliding travel at the speed of and in the direction of stock travel concurrently with actuation of said means (h) to actuate said movable bed, and
   (m) drive means to retract said die holders in said reciprocable travel,
       whereby said stock may be severed and notched at a suitable stage of contour development to afford minimum distortion of stock material.

2. In a machine as set forth in claim 1,
   (n) a third die mounted on the first die holder and actuable in reciprocable sliding travel thereon to and from said passive die to coact therewith and strike notches in one of said contours,
   (o) cam means responsive to actuation of the movable die bed (d), and effective to drive said third die in said travel.

3. A machine as set forth in claim 2, said cam means (o) being attached to and carried by the second die holder (e).

4. In a machine as set forth in claim 3,
   (p) said third die (n) being formed with a hole having camming faces to receive said cam means (o) for actuation thereby.

5. In a machine as set forth in claim 4,
   (q) guide means in the first die holder to guide said cam means (o) for effective actuation of the third die (n).

6. A machine as set forth in claim 1,
   (r) a first power source to drive said rollers (a) about their axes of rotation,
   (s) geared means transmitting said drive from said power source (r) to said rollers (a),
   (t) geared means transmitting a drive from said power source to the drive means (l) to advance the die holders,
(u) a second power source to effect retraction of said die holders,
(v) a means to transmit a retractive drive from said second power source (u) to said drive means (m) to retract the die holders after the stock is severed and notched.

7. In a machine as set forth in claim 6,
(w) a clutch means, associated with said geared means (u), and engageable to afford a drive to advance said holders, when the means (h) actuates the movable die bed toward the stationary die bed.

8. In a machine as set forth in claim 7,
said power source (u) to retract the die holders being effective when said clutch means (w) is disengaged.

References Cited by the Examiner
UNITED STATES PATENTS

| | | | |
|---|---|---|---|
| 2,969,826 | 1/1961 | Allen et al. | 72—176 |
| 3,140,739 | 7/1964 | Moltchan | 72—129 |

CHARLES W. LANHAM, *Primary Examiner.*

W. H. JUST, *Assistant Examiner.*